(12) United States Patent
Zhang et al.

(10) Patent No.: US 12,393,997 B2
(45) Date of Patent: Aug. 19, 2025

(54) IN-PLACE SUPERVISION METHOD AND APPARATUS SUITABLE FOR OVERHEAD TRANSMISSION LINE MAINTENANCE OPERATION

(71) Applicant: ELECTRIC POWER RESEARCH INSTITUTE OF GUANGXI POWER GRID CO., LTD., Guangxi (CN)

(72) Inventors: Wei Zhang, Guangxi (CN); Xiangyu Lin, Guangxi (CN); Boya Peng, Guangxi (CN); Tong Wang, Guangxi (CN); Hao Qiu, Guangxi (CN); Shan Li, Guangxi (CN); Jianna Ouyang, Guangxi (CN)

( * ) Notice: Subject to any disclaimer, the term of this patent is extended or adjusted under 35 U.S.C. 154(b) by 0 days.

(21) Appl. No.: 17/802,295

(22) PCT Filed: May 20, 2021

(86) PCT No.: PCT/CN2021/094812
§ 371 (c)(1),
(2) Date: Aug. 25, 2022

(87) PCT Pub. No.: WO2022/022022
PCT Pub. Date: Feb. 3, 2022

(65) Prior Publication Data
US 2023/0095882 A1 Mar. 30, 2023

(30) Foreign Application Priority Data
Jul. 31, 2020 (CN) .......................... 202010761620.2

(51) Int. Cl.
*G06Q 50/06* (2024.01)
(52) U.S. Cl.
CPC .................................. *G06Q 50/06* (2013.01)

(58) Field of Classification Search
CPC .......... G06Q 50/00; G06Q 50/06; H04Q 9/00; H04Q 2209/00; H04Q 2209/10;
(Continued)

(56) References Cited

U.S. PATENT DOCUMENTS

| 2015/0123787 | A1* | 5/2015 | Watson | G06Q 10/06 340/539.13 |
| 2018/0268346 | A1* | 9/2018 | Cronin | G06Q 10/063116 |
| 2022/0019949 | A1* | 1/2022 | Shobu | G06Q 50/04 |

FOREIGN PATENT DOCUMENTS

| CN | 107040991 A | 8/2017 |
| CN | 109993431 A | 7/2019 |

(Continued)

OTHER PUBLICATIONS

International search report of PCT/CN2021/094812.

*Primary Examiner* — Franklin D Balseca (57) ABSTRACT

Disclosed are an in-place supervision method and apparatus suitable for overhead transmission line maintenance operation, the method includes: geographic coordinate information of an overhead transmission line is written into a risk management and control master station system of the whole electric power operation process, and an in-place supervision algorithm is written into the risk management and control master station system of the whole electric power operation process; geodetic coordinates A of a maintenance operation site and geodetic coordinates B of a supervisor are read; a distance is solved based on an elliptic spherical arc length approximate chord length algorithm; whether the distance S exceeds a threshold value of out of supervision or not is judged. In implementation of the invention, the execution level of in-place supervision of the overhead transmission line operation is improved, and the personal risk of the site of supervision operation is effectively controlled.

8 Claims, 3 Drawing Sheets

(58) Field of Classification Search
CPC ........... H04Q 2209/20; H04Q 2209/50; H04Q 2209/70; H04Q 2209/80; H04Q 2209/823; H04B 2203/5429; H04B 3/00; H04B 3/46; H04B 3/54
See application file for complete search history.

(56) References Cited

FOREIGN PATENT DOCUMENTS

| | | |
|---|---|---|
| CN | 110795989 A | 2/2020 |
| CN | 110958561 A | 4/2020 |
| CN | 112365145 A | 2/2021 |

* cited by examiner

IN-PLACE SUPERVISION METHOD AND APPARATUS SUITABLE FOR OVERHEAD TRANSMISSION LINE MAINTENANCE OPERATION

TECHNICAL FIELD

The invention relates to the technical field of electric power operation risk management and control, in particular to an in-place supervision method and apparatus suitable for overhead transmission line maintenance operation.

BACKGROUND

A transmission line is an important component of an electric power system, and an overhead transmission line is composed of a line tower, a lead, an insulator, a line hardware fitting, a stay wire, a tower foundation and a grounding device and is erected on the ground. According to the provisions of DL/T 1248-2013 'State Maintenance Guide of Overhead Transmission Lines', maintenance of overhead transmission lines includes maintenance with power outage and maintenance without power outage, and in the implementation of a maintenance project, safety management and control of a maintenance site need to be enhanced, and organizational measures, safety measures and technical measures need to be strictly implemented. Meanwhile, in the process of electric power maintenance, safety supervisors and safety production management principals of each unit (department) at corresponding levels are required to go deep into an operation site to carry out in-place supervision according to the Safety Duty In-place Measurement Standard strictly, so that the safety measures are ensured to be comprehensively, timely and effectively implemented.

At present, power grid enterprises begin to popularize a scene recorder in a bracket type or a wearable type, supervisors carry the scene recorder to the operation site for application, then the functions of collecting and storing electric power operation videos, detecting human faces and identifying license plates can be realized, and it is uploaded to a visual remote supervision system of a provincial power grid emergency command center. Meanwhile, the Beidou satellite navigation system developed by China can provide all-day, all-weather and high-precision positioning, navigation and time service for users on the ground and near-earth space, and the geodetic positioning includes longitude, latitude and altitude information. If the scene recorder is integrated with a satellite positioning function, the in-place job-performing conditions of the safety supervisors and safety production management principals of each unit or department can be known; however, since positioning calculation is realized on the scene recorder, the information communication traffic of the network is large, the energy consumption of nodes is large, the solution is not suitable for large-scale popularization in the site of the overhead transmission line maintenance operation, so that an in-place supervision apparatus suitable for the scene recorder needs to be developed, an in-place supervision method needs to be provided for solving the problem that whether the overhead transmission line maintenance operation is out of supervision or not cannot be intelligently judged.

SUMMARY

Aiming at overcoming the defects of the relevant art, the invention provides an in-place supervision method and apparatus suitable for overhead transmission line maintenance operation. By comparing the distance between the coordinate position of a scene recorder and the coordinate position of an operation site, the moving area of the personnel during the maintenance operation is judged, the in-place job-performing condition of the supervisors is confirmed, and the personal risks of the maintenance operation site are effectively controlled.

In order to solve the technical problem, embodiments of the invention provide an in-place supervision method suitable for a site of overhead transmission line maintenance operation, which includes the following operations.

Geographic coordinate information of an overhead transmission line is written into a risk management and control master station system of the whole electric power operation process through a power grid GIS platform, and an in-place supervision algorithm is written into the risk management and control master station system of the whole electric power operation process by an engineer of a provincial power grid emergency command center.

Geodetic coordinates A of the maintenance operation site and geodetic coordinates B of the supervisors are read based on the risk management and control master station system of the whole electric power operation process.

A distance S is obtained through the geodetic coordinates A and the geodetic coordinates B, and the distance S is solved based on an elliptic spherical arc length approximate chord length algorithm.

Whether the distance S exceeds a threshold value of out of supervision or not is judged.

If not, a plane coordinate system of an active area C is constructed, and the active area C is solved based on a vector triangle area algorithm.

Whether the active area C exceeds a threshold value of out of supervision or not is judged.

It yes, the process returns for judging whether the distance S exceeds the threshold value of out of supervision or not.

Optionally, the operation that the geographic coordinate information of the overhead transmission line is written into the risk management and control master station system of the whole electric power operation process through the power grid GIS platform includes that, the information is written into the risk management and control master station system of the whole electric power operation process through a WebService interface or an API secondary development interface.

Optionally, the geodetic coordinates A of the maintenance operation site are $(L_A, B_A, H_A)$, where $L_A, B_A, H_A$ represent the geodetic longitude, latitude, and altitude of the maintenance operation site, respectively; and the geodetic coordinates B of the supervisor are $(L_B, B_B$ and $H_B$, where $L_B, B_B$ and $H_B$ represent the geodetic longitude, latitude and height of the supervisor, respectively.

Optionally, in that the distance S is solved based on the elliptic spherical arc length approximate chord length algorithm, a specific calculation formula is as follows:

$$S = \sqrt{\left[\frac{(L_A - L_B)\pi R_E \cos B_A}{180}\right]^2 + \left[\frac{(B_A - B_B)\pi R_E}{180}\right]^2}.$$

Where S represents the distance; $R_E$ represents the radius of the earth; t represents the circularity ratio; $L_A$ and $B_A$ represent the geodetic longitude and latitude of the maintenance operation site respectively; and $L_B$ and $B_B$ represent the geodetic longitude and latitude of the supervisor respectively.

Optionally, in that whether the distance S exceeds the threshold value of out of supervision or not is judged, the threshold value of the distance S is a first preset value.

Optionally, that the plane coordinate system of the active area C is constructed includes that: the plane coordinate system is constructed by taking the vertexes of an irregular polygon in the active area C, the geodetic coordinates of the maintenance operation site are taken as the original point, and the geodetic coordinates ($L_B$, $B_B$) are converted into plane coordinates (x, y).

Optionally, in that the active area C is solved based on the vector triangle area algorithm, a specific calculation formula is as follows:

$$C = \frac{1}{2}\sum_{k=1}^{n}(x_k y_{k+1} - x_{k+1}, y_k).$$

Where C represents the active area; n represents the number of vertexes of the irregular polygon, k represents the serial number of the vertexes, $x_k$ represents the abscissa of the kth point, $y_k$ represents the longitudinal ordinate of the kth point, $x_{k+1}$ represents the abscissa of the k+1th point, and $y_{k+1}$ represents the longitudinal ordinate of the k+1th point.

Optionally, in that whether the active area C exceeds the threshold value of out of supervision or not is judged, the threshold value of active area C is a second preset value.

Optionally, the method further includes: the supervisor carries a scene recorder to the site of the overhead transmission line maintenance operation; where a positioning module is embedded in the scene recorder, and the positioning module is a UM220-III chip.

In addition, the embodiments of the invention further provide an in-place supervision apparatus suitable for an overhead transmission line maintenance operation site, which includes the following modules.

A writing module, configured to write geographic coordinate information of an overhead transmission line into a risk management and control master station system of the whole electric power operation process through a power grid GIS platform, and an in-place supervision algorithm is written into the risk management and control master station system of the whole electric power operation process by an engineer of a provincial power grid emergency command center.

A reading module, configured to read geodetic coordinates A of the maintenance operation site and geodetic coordinates B of a supervisor based on the risk management and control master station system of the whole electric power operation process.

A distance calculating module, configured to obtain a distance S through the geodetic coordinates A and the geodetic coordinates B, and solve the distance S based on an elliptic spherical arc length approximate chord length algorithm.

A distance judging module, configured to judge whether the distance S exceeds a threshold value of out of supervision or not.

An active area calculating module, configured to construct a plane coordinate system of an active area C, and solve the active area C based on a vector triangle area algorithm.

An active area judging module, configured to judge whether the active area C exceeds a threshold value of out of supervision or not, and further configured to return for judging whether the distance S exceeds the threshold value of out of supervision or not.

In implementation of the invention, an in-place supervision method and apparatus suitable for a site of overhead transmission line overhaul operation are provided, in which whether the site of overhead transmission line overhaul operation is out of supervision or not by is judged by judging the threshold value of the distance between the supervisor and the operation site and the threshold value of the active area of the supervisor, so that the problem that the operation site is out of supervision is avoided, and the execution level of in-place supervision of the overhead transmission line operation is improved. In addition, by calculating the self-position by the scene recorder, the communication overhead and calculation amount of the network are reduced.

BRIEF DESCRIPTION OF THE DRAWINGS

In order to describe the technical solutions in the embodiments of the invention or the relevant art more clearly, the drawings required to the used in descriptions about the embodiments or the relevant art will be simply introduced below, obviously, the drawings described below are only some embodiments of the invention, and other drawings can further be obtained by those of ordinary skill in the art according to the drawings without creative work.

DETAILED DESCRIPTION OF THE EMBODIMENTS

The technical solutions in embodiments of the invention will be clearly and completely described with reference to the drawings in the embodiments of the invention, and obviously, the described embodiments are a part rather than all of the embodiments of the invention. All other embodiments obtained by those of ordinary skill in the art based on the embodiments of the invention without creative efforts shall fall within the protection scope of the invention.

Embodiment 1

Figure 1:
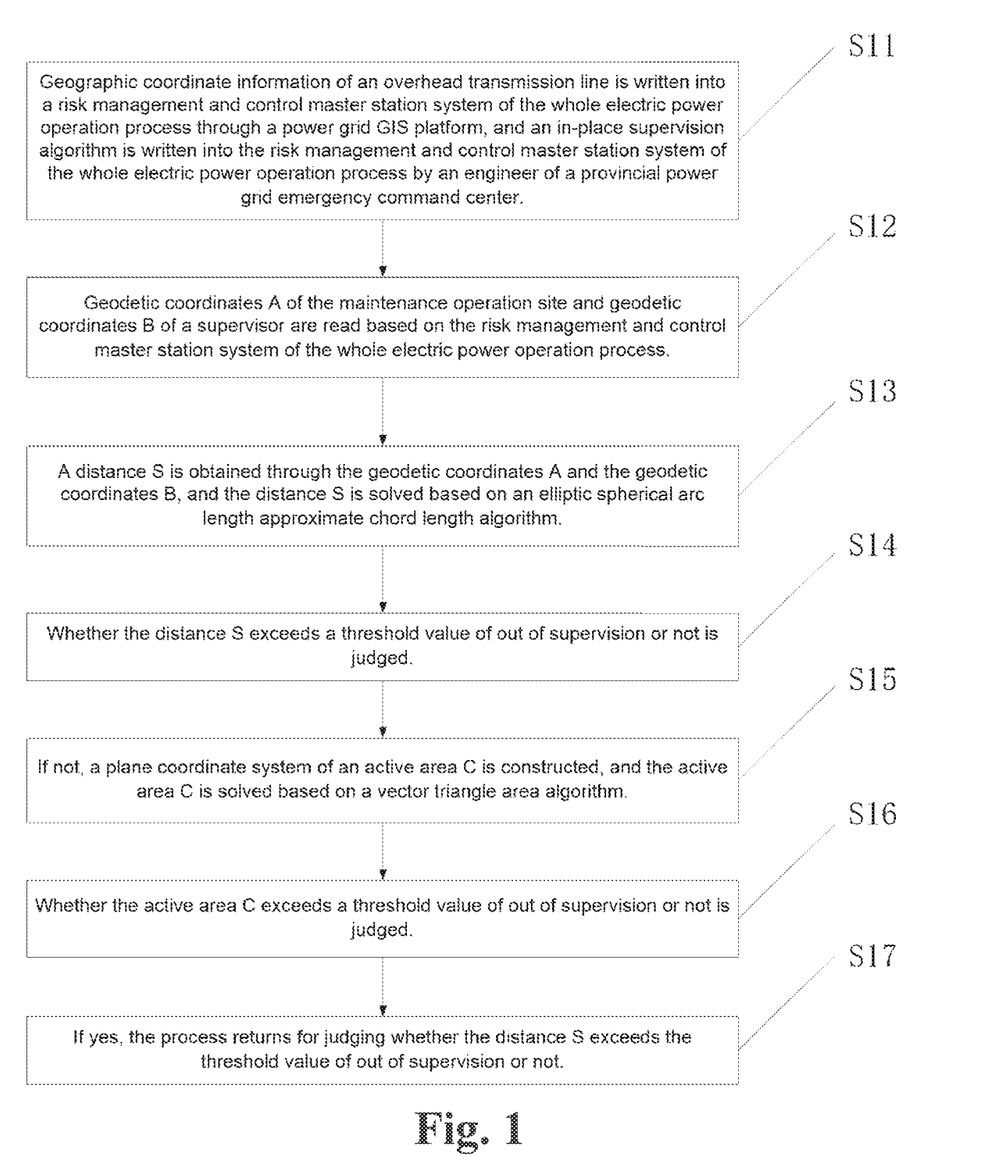
FIG. 1 is a flowchart of an in-place supervision method suitable for overhead transmission line maintenance operation in Embodiment 1 of the invention.

Referring to FIG. 1, FIG. 1 is a flowchart of an in-place supervision method suitable for overhead transmission line maintenance operation in Embodiment 1 of the invention.

As shown in FIG. 1, the in-place supervision method suitable for overhead transmission line maintenance operation includes the following operations.

S11, geographic coordinate information of an overhead transmission line is written into a risk management and control master station system of the whole electric power operation process through a power grid GIS platform, and an in-place supervision algorithm is written into the risk management and control master station system of the whole electric power operation process by an engineer of a provincial power grid emergency command center.

In the specific implementation process of the invention, the operation that the geographic coordinate information of the overhead transmission line is written into the risk management and control master station system of the whole electric power operation process includes that: the in is written into the risk management and control master station system of the whole electric power operation process through a WebService interface or an API secondary development interface. Specifically, in the WebService interface, the WebService interface is a common short message group sending submitting interface, and when the WebService interface is used, WebSerice can be called like a common function; the interface is mainly used for software, websites or other products of a user, a short message group sending function needs to be integrated in the software and the websites to serve as a part of the overall functions of the product, and in such a case, the WebService interface can be used for submitting short messages; certain basic programming, such as VC++, Delphi and ASP, is needed for realizing the short message group sending function of the WebService interface; in addition, the WebService interface supports XML, SOAP and WSDL; the XML is an extensible markup language, namely a subset under a standard general markup language, and is a basic format for representing data in a WebService platform; SOAP is a lightweight protocol for exchanging XML, a subset of the standard generalized markup language, and encoding information, which has three main aspects: XML-envelope defines a framework to describe the information content and how the content is processed, rules to encode program objects into XML objects, and performs the convention of remote procedure call RPC, and SOAP can run on any other transport protocol; the WSDL is a Web Service description language, and is based on XML, namely, a subset of the standard generalized markup language, which is a formal description document provided in a machine readable manner, and is used for describing the Web Service and its functions, parameters and return values. Specifically, the API secondary development interface is that for software for providing secondary development on the original basis, and its port is the API secondary development interface; secondary development means that customization modification and function expansion are carried out on existing software, and then desired functions are achieved, and generally, a kernel of an original system is not changed. In the embodiment, for the API secondary development interface, the API interface is subjected to secondary development by a power grid company, so that the geographic coordinate information of the overhead transmission line is written into the risk management and control master station system of the whole electric power operation process.

It is to be noted that, the risk management and control master station system of the whole electric power operation process acquires the geographic coordinate information of the overhead power transmission line through the power grid GIS platform. Specifically, an electric power geographic information system, is also called as the power grid GIS platform, which can provide unified power grid resource graphic maintenance management for the related professional field of electric power production, and realize structured management and graphic display of power grid resources, and an enterprise-level power grid geographic information service platform for providing power grid graphics and analysis services for various business applications through a service-oriented architecture; the power grid GIS platform provides a logic component independent of a specific model through abstraction of power grid resource graphic management and graphic application requirements, and supports professional power grid resource graphic management and graphic application through platform configuration; the power grid GIS platform takes the space structure, position information and graphic visualization of power grid resources as a core, pays attention to the space position of power grid equipment and the topological information of a power grid, and provides power grid space information service for various power business applications; the power rid GIS platform has the main functions of basic graph management, power grid resource model construction and power grid thematic map management, and provides various power grid graphs and power grid analysis services. In the embodiment, the risk management and control master station system of the whole electric power operation process obtains the geographic coordinate information of the overhead transmission line through the power grid GIS platform.

S12, geodetic coordinates A of the maintenance operation site and geodetic coordinates B of a supervisor are read based on the risk management and control master station system of the whole electric power operation process.

In the specific implementation process of the invention, the geodetic coordinates A of the maintenance operation site are $(L_A, B_A, H_A)$, where $L_A, B_A$ and $H_A$ represent the geodetic longitude, latitude, and altitude of the maintenance operation site, respectively; and the geodetic coordinates B of the supervisor are $(L_B, B_B, H_B)$, where $L_B, B_B$ and $H_B$ represent the geodetic longitude, latitude and height of the supervisor, respectively.

It is to be stated that the geodetic coordinates A of the maintenance operation site are the position of the maintenance operation site listed by an electric power production work ticket, namely, $(L_A, B_A, H_A)$; and the geodetic coordinates B of the supervisor are the position of the positioning coordinate of the scene recorder carried by the supervisor, namely, $L_B, B_B, H_B$. In addition, the geodetic coordinates B of the supervisor are sent to a provincial power grid emergency command center through an electric power wireless private network, and the risk management and control master station system of the whole electric power operation process automatically judges whether an operation site is out of supervision or not; where the electric power wireless private network conforms to the regulations of Q/CSG 1204022-2017 Technical Specification for Electric Power Wireless Private Networks, and the selected frequencies include the electric power frequency at the frequency band of 230 megahertz and the frequency band of 1785-1805 megahertz. It is to be noted that supervisor is safety supervisor, and a principal of a unit or department.

S13, a distance S is obtained through the geodetic coordinates A and the geodetic coordinates B, and the distance S is solved based on an elliptic spherical arc length approximate chord length algorithm.

In the specific implementation process of the invention, the distance S is obtained through the geodetic coordinates A of the maintenance operation site and the geodetic coordinates B of the supervisor, where the distance S is the distance between the geodetic coordinates A of the maintenance operation site and the geodetic coordinate B of the supervisor; it should be noted that the distance S is a straight-line distance, that is, the straight-line distance between the geodetic coordinates A of the maintenance work site and the geodetic coordinate B of the supervisor.

Specifically, in that the distance S is solved based on the elliptic spherical arc length approximate chord length algorithm, a specific calculation formula is as follows:

$$S = \sqrt{\left[\frac{(L_A - L_B)\pi R_E \cos B_A}{180}\right]^2 + \left[\frac{(B_A - B_B)\pi R_E}{180}\right]^2}.$$

Where $R_E$ represents the radius of the earth; $\pi$ represents the circularity ratio; $L_A$ and $B_A$ represent the geodetic longitude and latitude of the maintenance operation site respectively; and $L_B$ and $B_B$ represent the geodetic longitude and latitude of the supervisor respectively.

It is to be noted that in the embodiment, RE=6371.393, and $\pi$=3.14159265.

S14, whether the distance S exceeds a threshold value of out of supervision or not is judged.

In the specific implementation of the invention, in that whether the distance S exceeds the threshold value of out of supervision or not is judged, the threshold value of the distance S is a first preset value. Specifically, in the embodiment, the first preset value is 30 in, and if the distance S exceeds the threshold value of out of supervision by 30 in, it is considered that the relevant personnel fails to effectively perform the in-site supervision duty.

Specifically, whether the distance S exceeds the threshold value of out of −30 m or not is judged; if yes, prewarning information is issued: if not, the following step, namely, S15 is performed, namely, a plane coordinate system of an active area C is constructed, and the active area C is solved based on a vector triangle area algorithm.

S15, if not, a plane coordinate system of an active area C is constructed, and the active area C is solved based on a vector triangle area algorithm.

In the specific implementation process of the invention, that the plane coordinate system of the active area C is constructed includes that: the plane coordinate system is constructed by taking the vertexes of an irregular polygon in the active area C, the geodetic coordinates of the maintenance operation site are taken as the original point, and the geodetic coordinates ($L_B$, $B_B$) are converted into plane coordinates (x, y). It is to be noted that the active area C is the active area of the supervisor during in-place supervision, and the active area C is the area of an irregular polygon.

Specifically, in that the active area C is solved based on the vector triangle area algorithm, a specific calculation formula is as follows:

$$C = \frac{1}{2}\sum_{k=1}^{n}(x_k y_{k+1} - x_{k+1}, y_k).$$

Where n represents the number of vertexes of the irregular polygon, k represents the serial number of the vertexes, $x_k$ represents the abscissa of the kth point, $y_k$ represents the longitudinal ordinate of the kth point, $x_{k+1}$ represents the abscissa of the k+1th point, and $y_{k+1}$ represents the longitudinal ordinate of the k−1th point.

S16, whether the active area C exceeds a threshold value of out of supervision or not is judged.

In the specific implementation process of the invention, in that whether the active area C exceeds the threshold value of out of supervision or not is judged, the threshold value of active area C is a second preset value. Specifically, in the embodiment, the second preset value is 2500 m2, and if the active area C exceeds the threshold value of out of supervision by 2500 m2, it is considered that the relevant personnel fails to effectively perform the in-site supervision duty.

Specifically, whether the active area C exceeds the threshold value of out of supervision by 2500 m or not is judged; if yes, the following step, namely, S17 is performed to return for judging whether the distance S exceeds the threshold value of out of supervision or not; if not, no step is executed, and the process ends.

S17, if yes, the process returns for judging whether the distance S exceeds the threshold value of out of supervision or not.

Specifically, the relevant description about whether the distance S exceeds the threshold value of out of supervision or not is judged in S14 will not be repeated here.

In addition, the in-place supervision method suitable for overhead transmission line maintenance operation further includes: the safety supervisor or safety production management principal carries the scene recorder to the overhead transmission line maintenance operation scene; where a positioning module is embedded in the scene recorder, and the positioning module is a UM220-III chip. Specifically, the UM220-III chip is a BDS+GPS dual-mode positioning module which has high performance, low power consumption, small size and convenient development and application, and has the characteristics of ARM9 inner core, high tracking sensitivity of 160 dBm, average cold start time of 32 seconds, SoC scheme adopted and NMEA output through a serial port.

Specifically, the scene recorder conforms to the regulations of GB/T 36481 2018 General Specification for Information Technology Scene Recorders, and has the functions of uploading, downloading and receiving information, including receiving positioning information provided by a satellite, namely, geodetic longitude L, geodetic latitude B and altitude H.

In implementation of the invention, the in-place supervision method and apparatus suitable for the overhead transmission line maintenance operation are provided, whether the overhead transmission line maintenance operation site is out of supervision or not can be intelligently judged by judging the threshold value of the distance between the supervisor and the operation site and the threshold value of the active area of the supervisor, so that the problem that the operation site is out of supervision is avoided, and the execution level of in-place supervision of the overhead transmission line operation is improved. In addition, by calculating the self-position by the scene recorder, the communication overhead and calculation amount of the network are reduced.

Embodiment 2

Figure 2:
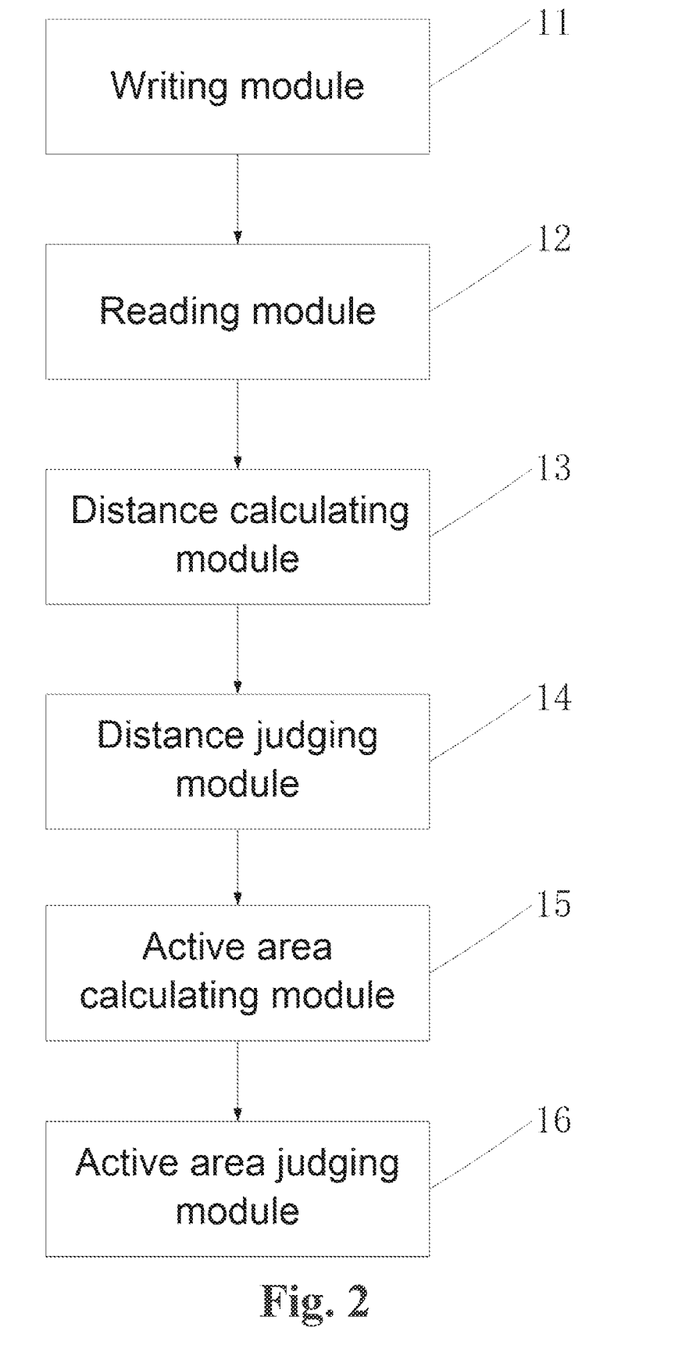
FIG. 2 is a schematic structure diagram of an in-place supervision apparatus suitable for an overhead transmission line maintenance operation site in Embodiment 2 of the invention.

Referring to FIG. 2, FIG. 2 is a schematic structure diagram of an in-place supervision apparatus suitable for a site of overhead transmission line maintenance operation in Embodiment 2 of the invention.

As shown in FIG. 2, the in-place supervision apparatus suitable for a site of overhead transmission line maintenance operation includes the following modules.

A writing module 11, configured to write geographic coordinate information of an overhead transmission line into a risk management and control master station system of the whole electric power operation process through a power grid GIS platform, and an in-place supervision algorithm is written into the risk management and control master station system of the whole electric power operation process by an engineer of a provincial power grid emergency command center.

A reading module 12, configured to read geodetic coordinates A of the maintenance operation site and geodetic coordinates B of a supervisor based on the risk management and control master station system of the whole electric power operation process.

A distance calculating module 13, configured to obtain a distance S through the geodetic coordinates A and the geodetic coordinates B, and solve the distance S based on an elliptic spherical arc length approximate chord length algorithm.

A distance judging module 14, configured to judge whether the distance S exceeds a threshold value of out of supervision or not.

An active area calculating module 15, configured to construct a plane coordinate system of the active area C, and solve the active area C based on a vector triangle area algorithm.

An active area judging module 16, configured to judge whether the active area C exceeds a threshold value of out of supervision or not, and further configured to return for judging whether the distance S exceeds the threshold value of out of supervision or not.

Specifically, the working principle of the apparatus related function module according to the embodiment of the invention may refer to the related description of the method embodiment 1, and is not described herein again.

In implementation of the invention, whether the site of the overhead transmission line overhaul operation is out of supervision or not can be intelligently judged judging the distance between the supervisor and the operation site and the active area, so that the problem that the operation site is out of supervision is avoided, the personal risks of the site of the overhead transmission line supervision operation is effectively controlled, and the execution level of in-place supervision of the overhead transmission line operation is improved; in addition, the self-position is calculated by the scene recorder, so that the communication overhead of the network and the calculation amount are effectively reduced.

Embodiment 3

The explanation is given by taking an example that 7 maintainers develop lead and ground wire sag adjustment and maintenance operations at the No. 012 tower of a 220 KV transmission line which runs for more than 5 years, and the specific steps are as follows.

S1, 1 safety supervisor performs in-place supervision on the supervision operation site according to the regulations of Safety Duty In-place Measurement Standard, and carries a scene recorder embedded with the in-place supervision method to the site of the overhead transmission line supervision operation; the scene recorder adopted by the safety supervisor conforms to the regulations of GB/136481 2018 General Specification for Information Technology Scene Recorders, and has the functions of uploading/downloading/receiving information, including receiving positioning information (information such as longitude, latitude, altitude and the like) provided by a Beidou satellite navigation system; in such a case, an in-place supervision algorithm is input into a risk management and control master station system of the whole electric power operation process, and the risk management and control master station system of the whole electric power operation process acquires the geographic coordinate information of the overhead power transmission line through a power grid GIS platform.

S2, the risk management and control master station system of the whole electric power operation process geodetic coordinates ($L_A$, $B_A$, $H_A$) at position A of the operation site, where the position A of the operation site refers to the No. 012 tower of a 220 KV transmission line.

S3, the risk management and control master station system of the whole electric power operation process obtains geodetic coordinates ($L_B$, $B_B$ and $H_B$) at position B of the scene recorder, and the position B of the scene recorder can be regarded as the position of the safety supervisor.

S4, the risk management and control master station system of the whole electric power operation process judges the distance and active area between the related personnel and the operation site in real time according to the geodetic coordinates ($L_B$, $B_B$ and $H_B$) which are returned by the scene recorder through the electric power wireless private network.

S5, the risk management and control master station system of the whole electric power operation process judges the distance and active area between the safety supervisor and the operation site in real time according to the geodetic coordinates (LB, BB and HB) which are returned by the scene recorder through the electric power wireless private network.

S6, the risk management and control master station system of the whole electric power operation process solves the space S between the position A of the supervision operation site and the position B of the scene recorder according to the principle of the elliptic spherical arc length approximate chord length algorithm, and judges whether the distance S exceeds the threshold value of out of supervision by 30 m or not in real time.

Figure 3:
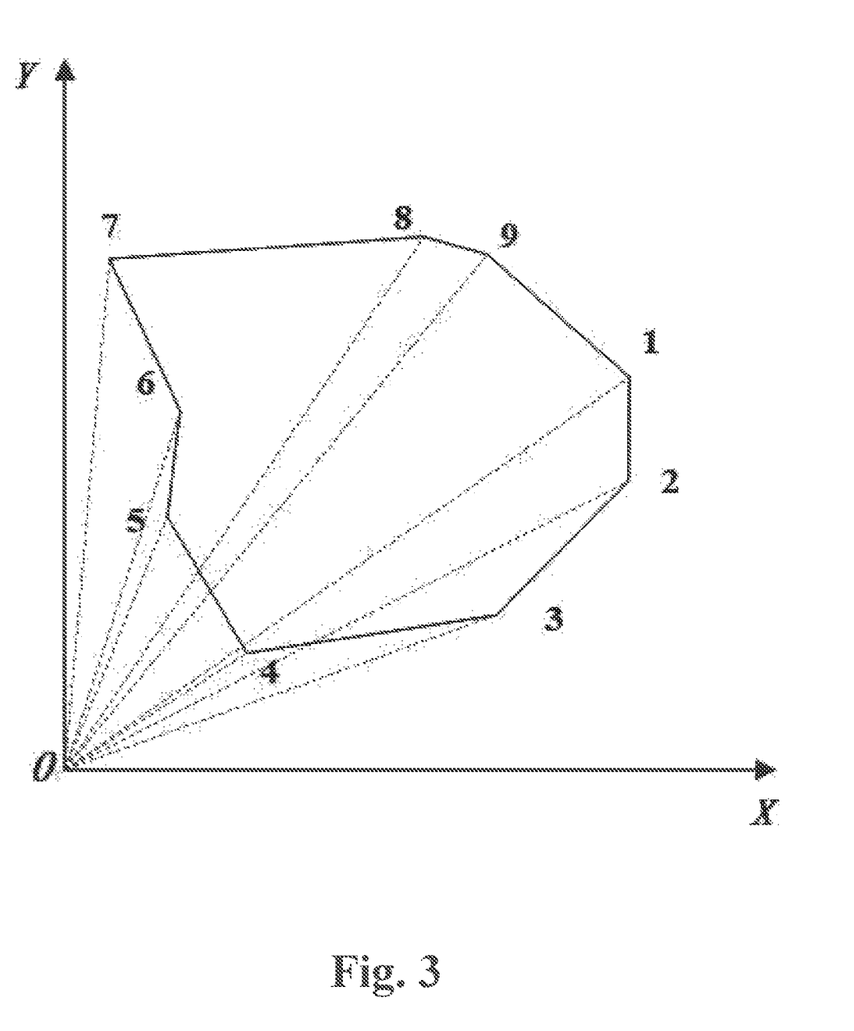
FIG. 3 is a schematic diagram of an active area C solved by a vector triangle area method in Embodiment 3 of the invention.

S7, the risk management and control master station system of the whole electric power operation process solves the active area C of the safety supervisor during in-place supervision according to the principle of a vector triangle area method, and judges whether the active area C exceeds the threshold value of out of supervision by 2500 m2 or not in real time; as shown in FIG. 3, the active area C shown in the FIG. 3 is an irregular polygon, each vertex of the active area C where the safety supervisor is located is connected with O, it can be seen that the active area C forms a plurality of triangles in the figure, and the area of the polygon is equivalent to the sum of the vector areas of the triangles; in FIGS. 3, 1 to 9 represent the position of each vertex of the active area C of the safety supervisor during the supervision operation.

S8, the lead and ground wire sag adjustment maintenance operation lasts for 3 hours and 15 minutes; during the period, the risk management and control master station system of the whole electric power operation process masters the distance and active area between the safety supervisor and the operation site in real time; where the distance between the safety supervisor and the operation site is in the range of 7-28 m, and the active area is about 810 $m^2$.

S9, according to the calculation result of the in-place supervision method in the risk management and control master station of the whole electric power operation process, a worker of a provincial power grid emergency command center judges that the safety supervisor carries out in-place supervision on the site of the overhead transmission line maintenance operation, and that the operation site is out of supervision is avoided.

In implementation of the invention, the in-place supervision method and apparatus suitable for the overhead transmission line overhaul operation are provided, whether the overhead transmission line overhaul operation site is out of supervision or not by can be intelligently judged by judging the threshold value of the distance between the supervisor and the operation site and the threshold value of the active area of the supervisor, so that the problem that the operation site is out of supervision is avoided, and the execution level of in-place supervision of the overhead transmission line operation is improved. In addition, by calculating the self-position by the scene recorder, the communication overhead and calculation amount of the network are reduced.

Those of ordinary skill in the art will appreciate that implementing all or part of the steps in the methods described in the above embodiments may be accomplished by instructing associated hardware by a program, which may be stored in a computer-readable storage medium, and the storage medium may include: a Read Only Memory (ROM), a Random Access Memory (RAM, a magnetic or optical disk, and the like.

In addition, the in-place supervision method and apparatus suitable for the overhead transmission line overhaul operation provided by the embodiments of the invention are described in detail, the principle and implementation mode of the invention have been described herein using specific examples, and the above description of the embodiments is only intended to help understand the method of the invention and its core idea; meanwhile, those of ordinary skill in the art may make variations in terms of specific implementation mode and scope of application in accordance with the idea of the invention, in view of the foregoing, the description is not to be taken in a limiting sense.

What is claimed is:

1. An in-place supervision method suitable for overhead transmission line maintenance operation, comprising:
    writing a geographic coordinate information of an overhead transmission line into a risk management and control master station system of a whole electric power operation process through a power grid GIS platform, the geographic coordinate information comprising geodetic coordinates A of a maintenance operation site;
    sending geodetic coordinates B of a supervisor to the risk management and control master station system of the whole electric power operation process through an electric power wireless private network, and writing an in-place supervision algorithm into the risk management and control master station system of the whole electric power operation process by an engineer of a provincial power grid emergency command center by using a writing device;
    reading the geodetic coordinates A of the maintenance operation site that have been written into the risk management and control master station system of the whole electric power operation process and the geodetic coordinates B of the supervisor that have been sent to the risk management and control master station system of the whole electric power operation process by using a reading device;
    acquiring a distance S through the geodetic coordinates A and the geodetic coordinates B, and solving the distance S based on an elliptic spherical arc length approximate chord length algorithm by using a distance calculating device;
    judging whether the distance S exceeds a first threshold value of out of supervision or not by using a distance judging device;
    if the distance S does not exceed the first threshold value of out of supervision, constructing a plane coordinate system of an active area C, and solving the active area C based on a vector triangle area algorithm by using an active area calculating device;
    judging whether the active area C exceeds a second threshold value of out of supervision or not; if the active area C exceeds the second threshold value of out of supervision, returning for judging whether the distance S exceeds the first threshold value of out of supervision or not by using an active area judging device,
    wherein the operation of constructing the plane coordinate system of the active area C comprises: constructing the plane coordinate system by taking vertexes of an irregular polygons in the active area C, the geodetic coordinates of the maintenance operation site are taken as an original point, and geodetic coordinates $L_B$ and $B_B$ are converted into plane coordinates (x, y),
    wherein in solving the active area C based on the vector triangle area algorithm, a specific calculation formula is as follows:

$$C = \frac{1}{2}\sum_{k=1}^{n}(x_k y_{k+1} - x_{k+1} y_k);$$

wherein n represents a number of vertexes of an irregular polygon, k represents a serial number of the vertexes, $x_k$ represents an abscissa of the kth point, $y_k$ represents a longitudinal ordinate of the kth point, $x_{k+1}$ represents an abscissa of the k+1th point, and $y_{k+1}$ represents a longitudinal ordinate of the k+1th point.

2. The in-place supervision method suitable for overhead transmission line maintenance operation as claimed in claim 1, wherein the operation of writing the geographic coordinate information of the overhead transmission line into the risk management and control master station system of the whole electric power operation process comprises: writing the information into the risk management and control master station system of the whole electric power operation process through a WebService interface or an API secondary development interface.

3. The in-place supervision method suitable for overhead transmission line maintenance operation as claimed in claim 1, wherein the geodetic coordinates A of the maintenance operation site are $L_A$, $B_A$ and $H_A$, wherein $L_A$, $B_A$ and $H_A$ represent a geodetic longitude, latitude, and altitude of the maintenance operation site, respectively; the geodetic coordinates B of the supervisor are $L_B$, $B_B$ and $H_B$, wherein $L_B$, $B_B$ and $H_B$ respectively represent a geodetic longitude, latitude and height of the supervisor.

4. The in-place supervision method suitable for overhead transmission line maintenance operation as claimed in claim 1, wherein in that the distance S is solved based on the elliptic spherical arc length approximate chord length algorithm, a specific calculation formula is as follows:

$$S = \sqrt{\left[\frac{(L_A - L_B)\pi R_E \cos B_A}{180}\right]^2 + \left[\frac{(B_A - B_B)\pi R_E}{180}\right]^2};$$

wherein $R_E$ represents a radius of the earth; $\pi$ represents a circularity ratio; $L_A$ and $B_A$ represent a geodetic longitude and latitude of the maintenance operation site respectively; $L_B$ and BB represent a geodetic longitude and latitude of the supervisor respectively.

5. The in-place supervision method suitable for overhead transmission line maintenance operation as claimed in claim 1, wherein in whether the distance S exceeds the first threshold value of out of supervision or not is judged, the first threshold value of out of supervision is a first preset value.

6. The in-place supervision method suitable for overhead transmission line maintenance operation as claimed in claim 1, wherein in judging whether the active area C exceeds the second threshold value of out of supervision or not, the second threshold value of out of supervision is a second preset value.

7. The in-place supervision method suitable for overhead transmission line maintenance operation as claimed in claim 1, further comprising: carrying, by a safety supervisor, a scene recorder to an overhead transmission line maintenance operation scene; wherein a positioning device is embedded in the scene recorder, and the positioning device is a UM220-III chip.

8. An in-place supervision apparatus suitable for overhead transmission line maintenance operation, comprising:
- a writing device, configured to write a geographic coordinate information of an overhead transmission line into a risk management and control master station system of a whole electric power operation process through a power grid GIS platform, the geographic coordinate information comprising geodetic coordinates A of a maintenance operation site; send geodetic coordinates B of a supervisor to the risk management and control master station system through an electric power wireless private network, and write an in-place supervision algorithm into the risk management and control master station system of the whole electric power operation process by an engineer of a provincial power grid emergency command center;
- a reading device, configured to read the geodetic coordinates A of the maintenance operation site that have been written into the risk management and control master station system of the whole electric power operation process and the geodetic coordinates B of the supervisor that have been sent to the risk management and control master station system of the whole electric power operation process;
- a distance calculating device, configured to obtain a distance S through the geodetic coordinates A and the geodetic coordinates B, and solve the distance S based on an elliptic spherical arc length approximate chord length algorithm;
- a distance judging device, configured to judge whether the distance S exceeds a first threshold value of out of supervision or not;
- an active area calculating device, configured to construct a plane coordinate system of an active area C, and solve the active area C based on a vector triangle area algorithm;
- an active area judging device, configured to judge whether the active area C exceeds a second threshold value of out of supervision or not, and further configured to return for judging whether the distance S exceeds the first threshold value of out of supervision or not.

* * * * *